May 8, 1934.  T. J. YATES  1,958,223

WATER METER

Filed Nov. 9, 1932

Inventor
Thomas J. Yates
by Wright, Brown, Quinby & May
Attys

Patented May 8, 1934

UNITED STATES PATENT OFFICE 1,958,223

WATER METER

Thomas J. Yates, Salem, Mass., assignor to Yates Machine Company, Salem, Mass., a corporation of Massachusetts Application November 9, 1932, Serial No. 641,853

5 Claims. (Cl. 73—37)

This invention relates to apparatus for measuring liquid flowing through a pipe. The embodiment of the invention herein illustrated and described is of the type employing a paddle wheel to be rotated by the stream, and is especially intended for use with commercial washing machines such as are used in laundries. In washing a batch of clothes in a commercial washing machine, the several steps of the process require changes of water in the machine. For any given step in a machine of a given size, a definite amount of water is necessary for best results. Less than this amount is insufficient; more than this amount is waste. Hence a meter capable of tripping a valve in the supply pipe or actuating a signal when a predetermined quantity of water has entered the machine, is desirable. According to the present invention, a valve-tripping meter is provided, having improved features of structure which render it simple, durable and rugged.

For a more complete understanding of the invention reference may be had to the description thereof which follows, and to the drawing, of which,—

Figure 1:
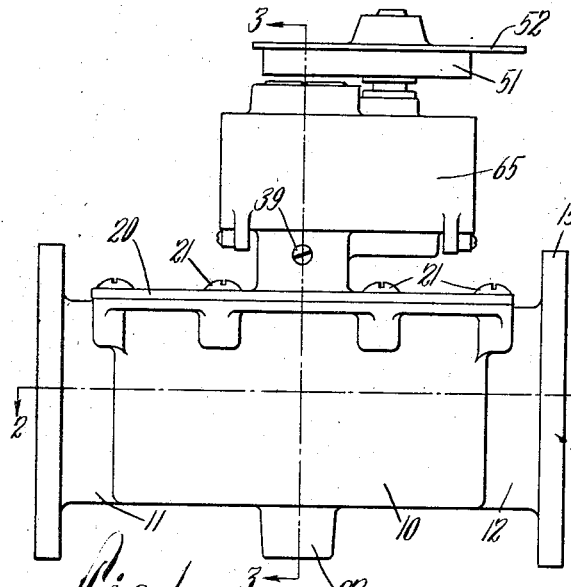
Figure 1 is a plan view of an embodiment of the invention.
Figure 3:
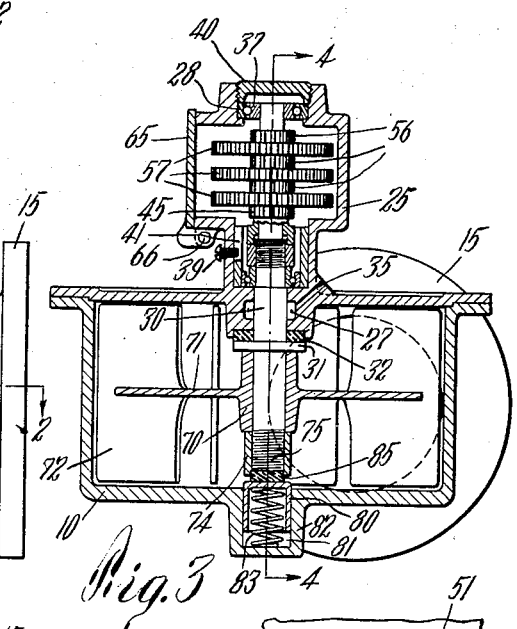
Figure 3 is a section on the line 3—3 of Figure 1.
Figure 2:
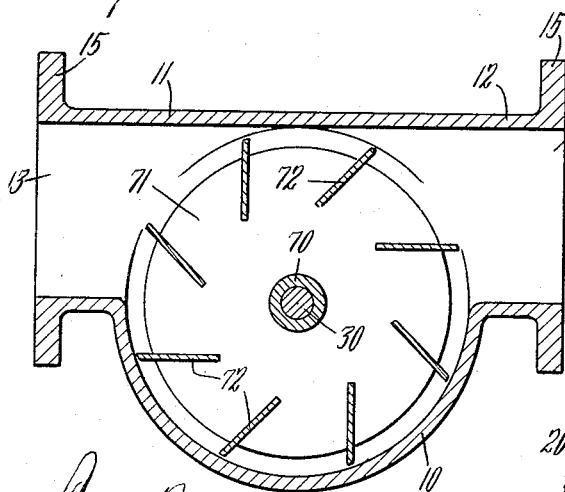
Figure 2 is a section on the line 2—2 of Figure 1.
Figure 4:
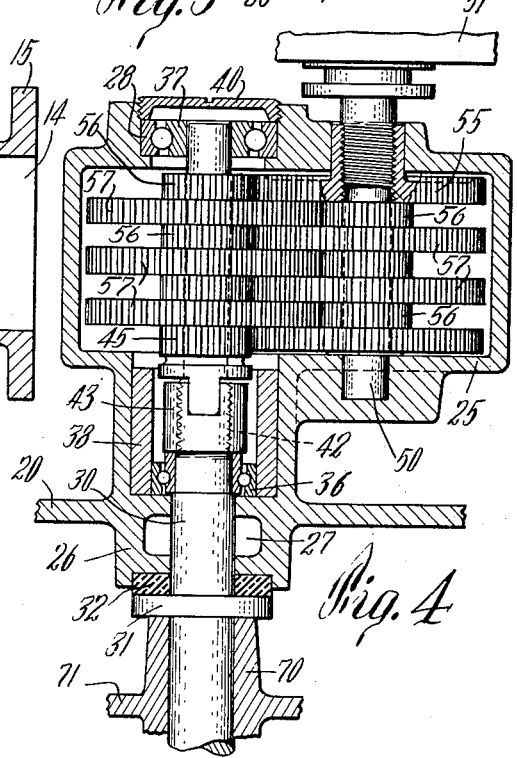
Figure 4 is a fragmentary section on the line 4—4 of Figure 3.
Figure 5:
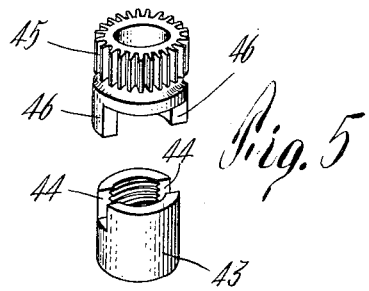
Figure 5 is a perspective view of two of the parts of the meter.

The meter as a whole may be housed in a casing which, as shown, may consist of a cup shaped portion 10 having tangential extensions 11 and 12 forming an inlet 13 and an outlet 14 for the chamber, these extensions preferably having flanges 15 to facilitate connection of the meter into a pipe line. The cup shaped portion 10 of the casing is provided with a circular cover plate 20 to form an enclosed chamber for a paddle-wheel. The cover plate 20 may be secured to the cup shaped portion 10 of the casing by any suitable means such as a circular series of machine screws 21 uniformly spaced from each other so that the plate 20 can be secured to the casing member 10 in any one of a number of angular positions relative thereto. Projecting from the central portion of the cover plate 20 is an extension forming a gear box 25. This gear box, as indicated on the drawing, may be integral with the cover plate 20. On the inner face of the cover 20 is a central boss 26 having a cavity 27 therein. A bore for a paddle-wheel shaft extends through this boss and cavity, the gear box 25 also having an opening 28 through its further wall alined with this bore. A paddle-wheel shaft 30 fits loosely in the bore and projects into the gear box. On the portion of the shaft which is within the paddle-wheel chamber is a peripheral rib 31 having a shoulder toward the boss 26. Between this rib and the boss is a sealing washer 32 of anti-friction material. For this purpose hard rubber is suitable. Such material provides a good seal against leakage through the boss around the shaft, provided that the surfaces of the wall and shaft shoulder against which the washer rests are reasonably smooth.

In a water meter which is continuously filled with water for an operation, the surface of the rubber washer is constantly wetted so that there is a low coefficient of friction between the rubber surface and the metal face of the shoulder resting against it. The drainage cavity 27 is connected to the outside casing as by a duct 35 so that if any water leaks past the washer 32, it drains from the casing and does not work into the gear box. A pair of ball-bearings 36 and 37 are mounted in the gear box for the shaft 30. The bearing 36 is mounted in a sleeve 38 which fits into a portion of the gear box adjacent to the plate 20 and is coaxial with the shaft 30. The sleeve 38 may be held loosely in place by a screw 39 the end of which projects into a slot 41 in the sleeve. The bearing 37 is at the further end of the shaft 30. This bearing fits into the opening 28 and is fixed in place against a suitable shoulder by a screw cap 40. The portion of the shaft 30 adjacent to the bearing 36 is threaded as at 42, the remaining portion within the gear box being smooth and of reduced diameter. A threaded collar 43 is screwed on to the threaded portion 42, the threaded collar having a pair of end slots 44. A pinion 45 is loosely mounted on the shaft 30, this pinion having projecting hub portions 46 adapted to engage in the recesses 44 of the collar 43 so that the pinion 45 will be rotatable with the shaft 30 but will be axially movable thereon. The collar 43 clamps the inner member of the ball-bearing 36 against a shoulder on the shaft 30. In case of wear on the part of the washer 32, the slot 41 into which the screw 39 projects and the lug-and-notch connection between the collar 43 and pinion 45 permit the shaft 30, the collar 43, the ball-bearing 36 and the sleeve 38 to adjust themselves longitudinally as a unit without causing any binding of the gear wheels or other moving parts. Parallel to the shaft 30 is a second shaft 50. One end of this shaft is journalled in the wall of the gear box, the other end of the shaft 50 projecting outward through the wall of the gear box to support a cam 51, a graduated dial 52, or other desired element outside of the casing. Secured to the shaft 50 where it projects through the wall of the casing is a gear wheel 55 within the gear box. This may be secured to the shaft in any suitable manner as by a left hand screw thread as shown.

The gear wheel 55 meshes with a pinion 56 which is coaxially secured to a gear wheel 57, the unit composed of the pinion 56 and gear wheel 57 being loosely mounted on the shaft 30. Other similar units are freely rotatably mounted on the shafts 30 and 50, each pinion 56 meshing with the gear wheel 57 of the next successive unit on the other shaft. The pinion 45, which rotates with the shaft 30, is an element of this train of gearing, the gears being so arranged that the rate of rotation of the shaft 50 is only a small fraction of the rate of rotation of the shaft 30. The gear box 25 preferably contains a bath of grease or heavy oil in which the gears run. If any of the grease or oil works along the shaft 30 past the ball bearing 36, it may be caught in the drain cavity 27. The shaft 30 is free to slide axially in the ball bearings 36 and 37 and also in the gear elements mounted loosely thereon. Thus in case of end wear of the shaft, the resulting axial displacement thereof does not bind the gearing.

A suitable cover 65 may be provided for the gear box to protect the gears, this cover being conveniently hinged as at 66. The cover plate 20 for the paddle-wheel chamber may be mounted in various angular positions acording as it is desired to connect the meter in a horizontal pipe or in a vertical pipe. Whichever way it is installed, it is desirable that the gear box cover 65 be uppermost so that the gear box can hold oil or grease.

Mounted on the portion of the shaft 30 which is within the paddle-wheel chamber is a suitable paddle-wheel which may consist of a hub portion 70 with a radial circular plate 71, a series of paddles 72 being secured to this plate. The stream of water entering the inlet 13 strikes the paddles one after the other and causes the paddle-wheel to rotate the shaft 30. In order to secure the paddle-wheel to the shaft, a suitable nut 74 is screwed on to a threaded end portion 75 of the shaft 30, the nut clamping the hub portion 70 of the paddle-wheel against the rib 31.

To prevent leakage of water into the drain cavity 27, the rib 31 of the shaft should be constantly pressed against the washer 32. Any suitable device may be employed to press the shaft 30 axially for this purpose. As shown, such a device may be in the form of a spring pressed button bearing constantly against the end of the shaft. The button is shown in the form of a cup-shaped plunger 80 slidable in a recess 81 in a central boss 82 on the casing member 10. A suitable spring 83 is compressed within the plunger 80 to press it toward the end of the shaft 30. For a non-corroding anti-friction end-bearing, a hard-rubber disk 85 is seated against the end of the shaft and is held in place by the nut 74, the end of which projects slightly beyond the end of the shaft. The end face of the plunger 80 engages the disk 85 to press the shaft 30 axially, thus substantially preventing leakage of water along the shaft 30 into the drain cavity 27.

It is evident that many modifications and changes may be made in the specific embodiment herein shown and described without departing from the spirit or scope of the invention as defined in the following claims.

What I claim is:

1. A water-meter comprising a paddle-wheel, a casing for said paddle-wheel, a paddle-wheel shaft projecting from said casing, a pinion on said shaft and rotatable therewith, a second shaft rotatably mounted parallel and adjacent to the projecting portion of the paddle-wheel shaft, a member to be rotated, a gear wheel on said second shaft rotatable with said member, and reduction gearing connecting said pinion and gear wheel, said reduction gearing comprising gear wheels and pinions loosely mounted on said shafts.

2. A water-meter comprising a casing enclosing a paddle-wheel chamber and having an inlet and outlet, said casing having an extended portion defining a gear-box, a pair of spaced aligned bearings in said gear-box, a shaft supported entirely by said bearings having a portion projecting into the paddle-wheel chamber, a peripheral rib on the shaft within the chamber, a paddle-wheel mounted on said shaft against said rib, an anti-friction sealing washer on said shaft between said rib and the adjacent wall portion of said casing, and a resilient end-bearing device in said casing pressing said rib against said washer.

3. A water-meter comprising a casing enclosing a paddle-wheel chamber, said casing having an extension on one wall thereof defining a gear-box, said wall having a shaft-hole therethrough and a drain cavity therein, a shaft extending loosely through said hole from said gear-box into said chamber, bearing means in said gear-box for supporting said shaft, a paddle-wheel on said shaft within the chamber, a rib on said shaft within the chamber, a sealing washer between said rib and the adjacent wall portion of the casing, and means resiliently pressing said shaft axially to press said rib against said washer.

4. A water-meter comprising a casing consisting of a cup-shaped element with lateral openings for inlet and outlet and a circular cover plate removably secured to said element to form a paddle-wheel chamber, an integral extension on said cover plate defining a gear case, a pair of parallel shafts journalled in and entirely supported by said gear case, one of said shafts having a shouldered portion projecting through the casing wall into the paddle-wheel chamber, the other shaft having a portion projecting outwardly through the wall of the gear case, a paddle-wheel mounted on the shaft portion within the chamber, a sealing washer of anti-friction material on said shaft between said shoulder and the adjacent wall portion of the casing, means for pressing said shaft axially to press said shoulder against said washer, and gearing connecting the two said shafts.

5. In a water-meter a casing forming a paddle-wheel chamber with an inlet and an outlet, an extension on said casing defining a gear-box, reduction gear wheels and pinions in said box, a pair of spaced ball-bearings in said box, a shaft supported by said bearings extending through the wall between the chamber and gear-box and projecting into both, a paddle-wheel fixed on the portion of the shaft in the chamber, the portion of the shaft in the gear-box being axially movable in said gear wheels and bearings, said shaft having a shoulder in said chamber, a sealing washer between said shoulder and the casing wall, and means pressing said shaft axially to press said shoulder against said washer.

THOMAS J. YATES.